(12) United States Patent
Bachmann et al.

(10) Patent No.: US 7,691,557 B2
(45) Date of Patent: Apr. 6, 2010

(54) POLYMERIZABLE COMPOSITION EXHIBITING PERMANENT COLOR CHANGE AS CURE INDICATOR

(75) Inventors: Andrew G. Bachmann, Litchfield, CT (US); Stephen E. Cantor, Cheshire, CT (US); Igor V. Khudyakov, Avon, CT (US)

(73) Assignee: Dymax Corporation, Torrington, CT (US)

( * ) Notice: Subject to any disclaimer, the term of this patent is extended or adjusted under 35 U.S.C. 154(b) by 593 days.

(21) Appl. No.: 11/169,532

(22) Filed: Jun. 29, 2005

(65) Prior Publication Data

US 2007/0004836 A1    Jan. 4, 2007

(51) Int. Cl.
*G03F 7/028* (2006.01)
*C08F 2/50* (2006.01)

(52) U.S. Cl. .................. 430/270.1; 522/6

(58) Field of Classification Search ............ 430/270, 430/270.1; 522/33, 6
See application file for complete search history.

(56) References Cited

U.S. PATENT DOCUMENTS

| | | | |
|---|---|---|---|
| 5,496,677 A * | 3/1996 | Toyama et al. .............. 430/162 |
| 6,040,040 A * | 3/2000 | Rainbow .................... 428/32.6 |
| 6,350,792 B1 * | 2/2002 | Smetana et al. .............. 522/81 |
| 6,387,981 B1 * | 5/2002 | Zhang et al. ................. 523/117 |
| 6,890,399 B2 | 5/2005 | Wojciak .................. 156/275.5 |
| 2003/0009053 A1 * | 1/2003 | Nishikubo et al. ........... 560/208 |
| 2003/0068575 A1 * | 4/2003 | Yanaka .................... 430/270.1 |
| 2003/0139488 A1 * | 7/2003 | Wojciak ....................... 522/75 |
| 2003/0149124 A1 * | 8/2003 | Thommes et al. ............. 522/75 |
| 2004/0170923 A1 * | 9/2004 | Steinmann et al. ....... 430/280.1 |

OTHER PUBLICATIONS

Radical Addition Rate Constants to Acrylates and Oxygen: α-Hydroxy and α-Amino Radicals Provided by Photolysis of Photoinitiators (Jackush et al. J. Am. Chem. Soc. 1999, 121, 3921-3925).

Quantitative rate constants for the reaction of dyes and alkenes with α-hydroxyalkyl radicals, measured by laser flash photolysis (Hunt et al.—Photochem. Photobiol. Sci. 2003, 2, 518-523).

* cited by examiner

*Primary Examiner*—Cynthia H Kelly
*Assistant Examiner*—Anca Eoff
(74) *Attorney, Agent, or Firm*—Ira S. Dorman

(57) ABSTRACT

A polymerizable acrylate or epoxy composition includes a dye comprised of a conjugated system containing a chromophore that is subject to effective decoupling, by a reactive alkylating species generated by the polymerization initiator, to produce a permanent loss of color and thereby to indicate that curing has occurred.

23 Claims, No Drawings

POLYMERIZABLE COMPOSITION EXHIBITING PERMANENT COLOR CHANGE AS CURE INDICATOR

BACKGROUND OF THE INVENTION

The prior art recognizes the desirability of incorporating dyes into polymerizable (meth)acrylate compositions, used as adhesives, sealants and coatings, to indicate cure. For example, Wojciak U.S. Pat. No. 6,890,399 discloses the use of anthraquinone and/or xanthene dyes for that purpose in such compositions. However, dyes taught by Wojciak exhibit an inherent photobleaching property (i.e., they lose color merely upon irradiation, even in the absence of photoinitiators), and do not therefore provide a reliable indication that curing of the composition has actually occurred; they show only that the composition has been exposed to a wavelength of radiation to which the dye itself responds by changing color.

Moreover, dyes disclosed by Wojciak do not undergo irreversible reaction under the curing conditions utilized, and therefore do not exhibit a permanent color change. The tendency for an original color to redevelop constitutes a serious drawback because, in many instances (e.g., in the fabrication of medical devices), it is imperative that assurance can be given, and can be demonstrated to the purchaser or consumer, that an adhesive employed has been fully cured and that harmful (e.g., cytotoxic) ingredients have been consumed; color redevelopment may be undersirable from aesthetic standpoints as well.

SUMMARY OF THE INVENTION

Accordingly, the broad objects of the present invention are to provide a novel polymerizable composition in which curing is reliably and unequivocally indicated, and to provide a novel polymerization method in which inherent confirmation of curing of the composition is afforded.

More specific objects of the invention are to provide such a composition and method wherein and whereby curing of the composition is indicated by a permanent color change.

Additional objects of the invention are to provide such a composition and method wherein the composition may be solvent-free and comprised of a (meth)acrylate monomer or an epoxy monomer, optionally including a vinyl compound (i.e., a vinyl ether or an allyl compound) copolymerizable therewith, and wherein and whereby curing may be initiated by a free radical or cationic mechanism, respectively.

A further object of the invention is to provide a composition having the foregoing features and advantages, wherein the dye is effectively maintained in solution and is of reduced extractability.

It has now been found that certain of the foregoing and related objects of the invention are readily attained by the provision of a composition that cures by polymerization and that exhibits a substantially permanent color change during curing (i.e., a color change that is irreversible under prevailing and anticipated conditions), the composition being comprised of: at least one polymerizable compound, the reaction of which is initiated by free radicals or ions as an active species; at least one initiator ingredient that generates such an active species, when activated, present in an amount sufficient to effect substantially complete curing of the composition; and a non-photobleaching dye present in the composition in an amount sufficient to impart perceptible color to the composition in the uncured state. The molecule of the dye comprises at least one extended conjugated system containing a chromophore that is subject to effective, substantially permanent decoupling, such as by alkylation of the molecule, at least at one site, so as to cause substantially complete and irreversible loss of the perceived color, and generally the molecule will comprise a plurality of conjugated systems or groups interconnected by a linking region, which region may advantageously provide the site at which the decoupling reaction occurs. The composition also contains at least one alkylating species that is effective for decoupling of the dye molecule conjugated system, in the presence of the active species and under the conditions of polymerization.

In certain embodiments of the invention the at least one polymerizable compound employed in the composition will be an unsaturated (meth)acrylate monomer and the active species generated will constitute free radicals. In other embodiments the polymerizable compound will be an epoxy monomer and the active species generated will constitute a cation. In either instance the composition may desirably include a copolymerizable vinyl ether or allyl compound, or another reactive diluent(s).

The dye utilized in the composition will preferably be a cationic triphenyl methane compound or a carotenoid, albeit the coloration imparted by the carotenoids may be insufficiently intense to render them suitable for use in certain cases. The initiator ingredient employed will preferably comprise at least one photoinitiator, which will most desirably be responsive to actinic radiation in the UV range of wavelengths for generating the active species; in the latter instances the composition may advantageously additionally include a coagent that sensitizes the photoinitiator to respond to wavelengths in the visible range as well.

Other objects of the invention are attained by the provision of a method for determining substantially complete cure of a polymerizable composition, the composition being characterized as hereinabove set forth. The method comprises the steps of subjecting the composition to conditions for effecting activation of the initiator, and of monitoring the composition to detect loss of the color imparted thereto by the incorporated dye. Depending upon the nature of the initiator, the conditions for effecting activation will comprise exposing the composition to appropriate wavelengths of actinic radiation, heating of the composition, or introducing a chemical activator agent thereinto.

DETAILED DESCRIPTION OF THE PREFERRED EMBODIMENTS

Exemplary of the efficacy of the invention are the following specific examples, wherein the amounts of ingredients are expressed in parts by weight, unless indicated otherwise:

Example One

An acrylate formulation was prepared to contain 40 parts isobornyl acrylate, 20 parts N,N-dimethyl acrylamide, 36 parts of an aliphatic urethane acrylate oligomer, and 300 parts per million (ppm) of Crystal Violet dye. A series of polymerizable compositions were prepared by admixing, with the foregoing formulation, two weight percent of each of the photoinitiators, or mixture of photoinitiators, listed below. A quantity of each composition was interposed between pairs of glass slides and between pairs of UV-blocked polycarbonate slides, and the resultant test samples were exposed to equal doses of UV radiation suitable for effecting curing (typically, 1 to 6 joules/cm$^2$ (UVA), using a metal halide D lamp, although other radiation sources and energy levels can of course be employed).

Full curing was achieved through the glass slides, accompanied by complete loss of color in the polymer, with all of the compositions tested except for those that contain UVI-6990 (a cationic initiator), which produced no cure and exhibited no color loss. The combination of UVI-6990 with an equal amount of IRGACURE 819, however, produced a partial cure and a significant loss of color.

When the same compositions were exposed to the same dose of UV radiation through the UV-blocked polycarbonate slides, among the photoinitiators listed only the mixture of equal parts of DAROCUR 1173 and ITX (a photosensitizer) produced curing and complete color loss. It will be appreciated that the photoinitiation of such a composition takes advantage of the visible spectral components that are usually generated by the UV source, and which pass through the polycarbonate "filter." No fading and no cure occurred in any of the other samples irradiated through the UV-blocked slides, with the exception of compositions containing either IRGACURE 819 or TPO (slight fading, with apparent curing, was observed in both instances), or compositions containing camphorquinone (some cure was observed, but without color loss).

All of the cured compositions in which color loss occurred were tested for permanency, by conditioning them for 16 hours at 54° C. and 100 percent relative humidity. In no instance was any reversion or redevelopment of color observed.

The photoinitiators used in this Example, and their chemical descriptions, are as follows: IRGACURE 819 (bis (2,4,6-trimethylbenzoylphenyl phosphine oxide); TPO (2,4,5-trimethyl(benzoyl)diphenylphosphine oxides); DAROCUR 1173 (HMPP) (2-hydroxymethyl-1-phenyl propanone); IRGACURE 184 (HCPK) (1-hydroxycyclohexyl phenyl ketone); IRGACURE 651 (BDK) (benzildimethyl ketal, or 2,2 dimethoxyl-2-phenylacetophenone); an equal parts mixture of benzophenone and BM611 (N-3-dimethylaminopropyl methacrylamide); an equal parts mixture of DAROCUR 1173 and ITX (isopropyl thioxanthone [mixture of 2 and 4 isomers]; UVI-6990 (mixed triarylsufonium hexafluorophosphate salts in 50% propylene carbonate); IRGACURE 369 (2-benzyl-2-N,N-dimethylamino-1-(4-morpholinophenyl)-1 butanone); IRGACURE 907 (2-methyl-1-[4-(methylthiophenyl]-2-morpholinopropanone); IRGACURE 2959 (4-(2-hydroxyethoxy)phenyl-(2-hydroxy-2-methylpropyl) ketone); an equal parts mixture of UVI-6990 and IRGACURE 819; and camphorquinone. Products identified hereinabove and hereinafter by the IRGACURE and DAROCUR designations are available from Ciba Specialty Chemicals company; UVI-6990 is available from Dow Chemical company.

Comparative Example One

Compositions were prepared using the acrylate formulation of Example One, substituting however xanthene and anthraquinone dyes, as taught in the above-mentioned Wojciak patent, for the Crystal Violet dye. A yellow composition containing 300 ppm Fluorscein (D & C Yellow #7) fades to a lighter yellow shade upon exposure, between glass slides, to cure-initiating radiation (UV radiation of similar dosage to that indicated above is used in all tests of this Example), and experiences some color redevelopment when subjected to the heat/humidity conditions described. A pink composition prepared from tetrabromofluoroscein (D & C Red #21, Eosin Y) fades to almost colorless upon UV exposure, and redevelops some color during the heat/humidity test, and another pink composition, prepared from tetrabromotetrachloro-fluoroscein (D & C Red #27), also fades under UV exposure and exhibits some color being regeneration during heat/humidity conditioning. Finally, two anthroquinone dyes (D & C Green #6 and D & C Violet #2) fade during UV exposure and regenerate to green/yellow and to a nondescript pale color, respectively, during conditioning.

Example Two

A series of cationic compositions were prepared to contain the ingredients identified in Table One below, in the amounts (parts by weight) set forth; all compositions additionally included four parts of the UVI-6990 cationic UV photoinitiator and 150 ppm of Crystal Violet dye. A quantity of each composition was interposed between two glass slides, and exposed (once or, if not then fully cured, twice) to a suitable dose of UV radiation, as hereinabove indicated. Full cure was achieved with all compositions, as was complete loss of color, after single- or double-dose exposure (on single-dose exposure, compositions A, B and C lost about 95, 50 and 80 percent of their original color, respectively).

TABLE ONE

| Ingredient | A | B | C | D | E | F |
|---|---|---|---|---|---|---|
| CYRACURE UVR-6110 | 96 | 76 |  | 96 | 76 |  |
| CYRACURE UVR-6128 |  |  | 96 |  |  | 96 |
| K-FLEX |  | 20 |  |  | 20 |  |
| DAROCUR 1173 |  |  |  | 2 | 2 | 2 |

CYRACURE UVR-6110 is 3,4-epoxycyclohexylmethyl 3,4-epoxycyclohexane, CYRACURE UVR-6128 is bis-(3,4-epoxycyclohexyl) adipate, and K-FLEX is a polyester polyol. The CYRACURE products are commercially available from Dow Chemical company, and the K-FLEX polyol is sold by the King Industries company.

In no instance was any reversion or redevelopment of color observed in any of the cured compositions upon being tested for permanency of color loss, in the manner described hereinabove.

Example Three

An equal amount of each of four dyes, i.e, D & C Red #27, Methylene Blue, Crystal Violet and Victoria Blue, was dissolved in each of three liquid substances, i.e., isopropyl alcohol, hydroxyethyl methacrylate, and an epoxy resin formulation. A suitable UV-reactive photoinitiator was added, in the amount of 2.0 weight percent, to a portion of each of the foregoing formulations, so as to produce both photoinitiator-free and also photoinitiator-containing samples, and the samples were exposed, for a period of two minutes, to radiation from a Dymax EC 2000 UV lamp.

In all cases the formulations containing D & C Red #27 and Methylene Blue lost their red and blue coloration, respectively, regardless of whether the photoinitiator was included, thus demonstrating photobleaching and an inability to indicate the presence of an active species (as for initiating curing in a polymerizable composition). In contrast, the formulations containing the triphenyl methane dyes, Crystal Violet and Victoria Blue (embodying the present invention), changed to clear from violet and blue, respectively, only in the presence of the photoinitiator; no color change was visually perceptible in the corresponding initiator-free samples.

As a further part of this Example, a series of free radical polymerizable acrylate formulations were prepared using a perester-catalyzed commercially available acrylate adhesive composition, each formulation containing one of the four dyes identified above. Upon introduction of a conventional amine/aldehyde chemical activator, the colors of the formulations containing each of the two triphenyl methanes (Crystal Violet and Victoria Blue) again changed to clear from violet and blue, respectively; no color change was perceptible in the formulations containing the Red #27 and the Methylene Blue dyes.

In no instance is reversion or redevelopment of color observed in procedures carried out to test the permanency of color loss.

Example Four

Each of the following dyes, embodying the invention, was admixed, at a concentration of 0.03 weight percent, with a medical grade adhesive formulation consisting essentially of an acrylated oligomer, dimethylaminoacrylate, TPO, and 2-hydroxymethyl-1-phenyl propanone: Crystal Violet (violet), Auramine O (dark yellow) and Chrome Azurol S (blue), Bromochlorophenol Blue (green), Cresol Red (yellow), and Bromopyrogallol Red (pink), each being a triphenyl methane dye; and Beta Carotene (yellow), which of course also comprises an extended conjugated dye system. Upon exposure to UV light (Dymax EC 2000 lamp, spaced about six inches away), one-quarter inch beads of the adhesives all faded to colorless from the color indicated in parentheses. Exposure of the adhesive deposits to boiling water in a shallow, open container, for a period of 20 minutes (an accelerated heat-humidity resistance test) caused no color to be regenerated in any instance.

Example Five

Crystal Violet dye was incorporated, at a concentration of 0.03 weight percent, into a metal-bonding adhesive gel formulation comprised of hydroxyethyl methacrylate, urethane oligomer, acrylic acid, tert-butyl perbenzoate, and a silica gel thickener. In one test, about 0.1 weight percent of VANAX (amine/aldehyde chemical curing agent) was added to the formulation to effect curing; in another test the formulation was cured by heating it to 120° C. for 20 minutes. The violet color disappeared completely in each instance, and the products remained colorless after being exposed to boiling water for a period of 20 minutes, as described above.

Example Six

Each of five photobleaching dyes (i.e., D & C Red #27, Methylene Blue, Eosin Yellow, D & C Green and D & C Violet) was admixed, in a concentration of 0.03 weight percent, with dimethylacrylamide monomer only (i.e., no catalyst or photoinitiator was included). In all instances the formulations faded from their colored states to a colorless state upon exposure to a typical, cure-inducing dose of UV radiation, thereby confirming the photobleaching property of the dyes; moreover, their original colorations (color and intensity) were regenerated upon being subjected to the boiling water treatment described above.

As indicated above, to be functional in the present compositions the molecule of the dye employed must consist of at least one extended conjugated system containing a chromophore, the molecular structure being that such stearic hindrance does not prevent or unduly impede effective attack by a free radical or ionic alkylating species. As used herein, the phrase "extended conjugated system" refers to a compound comprised of at least two aliphatic or aromatic unsaturated groups (e.g., benzene rings) joined by a linking region (e.g., an ethylene group, a methylene group, a diazo group, an alkyl radical or alkyl ion) through which resonance (mesomerism) occurs. At least one of the groups present in the system will be a chromogen, imparting color to the molecule in its oxidized state.

Mere hydrogenation of most (if not all) dyes will produce bleaching. Unless an organic group (e.g., an alkyl group) is introduced into the molecule to block oxidation and chromogen regeneration, in accordance with the present invention, the color change will, as far as is known, be reversible. A generalized (non-limiting) expression of an irreversible reaction that occurs with the dyes embodying the invention is as follows:

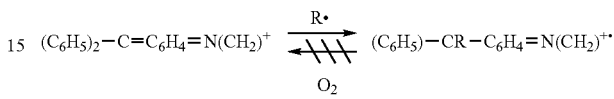

wherein R• is a free radical, alkylating species. In any event, because the same chemical species that initiates the polymerization reaction in the instant compositions also produces an alkylating species that effectively and irreversibly decouples the chromophore (e.g., isolates the chromophore from the conjugated system, or permanently disrupts or destroys resonance therein), loss of color provides a direct (and to an extent proportionate) indication of curing. While it is believed that such decoupling occurs through actual alkylation of the dye molecule, the theory of the invention is not fully understood and should not be deemed to impose any limitations thereupon.

As noted above, it is also important that the dye itself not inherently lose its color upon mere irradiation (i.e., that it not photobleach), because such a characteristic can produce false indications of curing (due for example to a formulation error, or if radiation that bleaches the dye is not of a wavelength that is effective to initiate the polymerization reaction, as well). For practical reasons, it is important that the color loss be permanent, that it be relatively insensitive to pH, and that it not be subject to redevelopment or regeneration with time, temperature, or humidity (e.g., under sterilization or environmental conditions). The anthraquinone, acridine, azo, diazonium, nitro, phthalocyanine, quinone-imine, tetrazolium, and xanthene dyes do not, for example, satisfy these criteria.

It is of interest to note that, in a paper entitled "Radical Addition Rate Constants to Acrylates and Oxygen: α-Hydroxy and α-Amino Radicals Produced by Photolysis of Photoinitiators" (*J. Am. Chem. Soc.* 1999, 121, 3921-3925), Jockusch et al. teach that n-butylacrylate radicals do not react with Crystal Violet. Indeed, such non-reactivity was regarded to be a prerequisite to the use of CV+ as an optical probe for studying the kinetics of the ketal radical, which is the subject of the paper. Here again, although the theory underlying the present invention is not fully understood it is believed that, in the composition and method defined, either the alkyl radicals produced do possess sufficiently high energy to react with the dye chromophores, or the concentrations of the alkyl radicals are sufficient to enable the decoupling reaction to proceed efficiently.

It is also interesting to note that Hunt et al. seem to demonstrate, in a paper entitled "Quantitative rate constants for the reaction of dyes and alkenes with α-hydroxyl radicals, measured by laser flash photolysis" (*Photochem. Photobiol. Sci.*, 2003, 2, 518-523), that some dyes can be reduced by hydroxyl containing radicals, such as hydroxy-2-propyl radical or 1-hydroxy-1-cyclohexyl radical from DAROCUR 1173 or IRGACURE 184, respectively. It is readily demonstrated however that such bleaching is easily reversible, and the instant specification discloses of course that free radicals from a wide variety of sources and curing conditions, as well as ionic species, can produce non-reversible color changes.

Arylmethane (diarylmethane and triarylmethane) dyes, and especially those that belong to the cationic triphenyl methane family, e.g., such conventional dyes as Crystal Violet, Victoria Blue, Malachite Green, and New Fuchsin, are preferred for use in the practice of the present invention; it will be appreciated however that any dye which sufficiently satisfies the criteria set forth above can be employed. For example, the diphenyl methane dyes, 2-(3-methylbenzylidene)-1H-indene-1,3(2H)-dione and Auromine O, and dyes having linear conjugated systems, including 4-nitrochalcone, Indocyanine Green, Beta Carotene and Astaxanthin, have been employed successfully. Normally, the dye ingredient will be present in the composition in an amount of 5 to 1000 ppm, but more or less may be employed depending upon the inherent intensity of the dye (e.g., higher concentrations of a relatively weak dye, such as Malachite Green, may be required).

In certain instances it will be desirable to take measures for better maintaining the dye in solution in the polymerizable composition, and for reducing its extractability. That can be achieved, in accordance with the present invention, by reacting the dye with a polymerizable ingredient (e.g., monomer, oligomer) of the composition, and the dye can be derivatized, if necessary, to promote such reaction and ensure that it becomes part of the growing polymer chain produced during curing. It goes without saying that any such reaction or derivatization must not affect the molecular structure of the dye so as to cause it to lose perceptible color in the uncured formulation or to significantly interfere with effective attack by the active species to effect decoupling of the chromophore.

It should be appreciated that references herein to perceptible color loss do not necessarily mean that the loss must be perceptible to the naked eye, albeit that effect will usually be preferred as a practical matter. The change can instead be one that is detected with the aid of a suitable instrument, and/or under appropriate irradiation (e.g., to induce fluorescence).

Insofar as concerns the polymerizaton initiators employed, numerous suitable chemicals have been identified herein. When used, a photoinitiator will normally be incorporated in a concentration of 1 to 8, and preferably no more than 4, percent, based upon the weight of the composition. It is perhaps notable that the phosphine oxide photoinitiators, which are widely employed for inducing free radical cure reactions, are not regarded to be satisfactory for use alone in the instant compositions; they have been found to not permit complete color loss (due perhaps to inadequate generation of active alkylation species of sufficiently high energy, or to retarding effects of stearic hindrance or other spatial relationships).

Photoinitiators that respond (undergo dissociation) under excitation by light in the ultraviolet and/or visible spectral regions will normally be preferred, as a practical matter. In addition to the compounds identified above, other conventional photoinitiators that might be utilized herein include bis ($\mu^5$-2,4-cycloypentadien-1-yl) bis [2,6-difluoro-3-(1H-pyrrol-1-yl)phenyl]titanium (IRGACURE 784DC); 1-hydroxycyclohexylphenyl ketone (IRGACURE 184); and DAROCUR 4265 (which is a 50 percent solution of 2,4,5-trimethyl benzoyl diphenyl-phosphine oxide in DAROCUR 1173). The photoinitiators disclosed in U.S. Pat. No. 4,820,744, particularly at line 43, column 4, through line 7, column 7, might also be found suitable for use.

Additional cationic type photoinitiators that can be employed in the practice of the invention include UVI-6974 (a mixture of triarylsufonium hexafluoroantimonate salts in 50 percent propylene carbonate); IRGACURE 261 (n5-2,4-cyclopenta-dien-1-yl[1,2,34,5,6-n)-(1-methylethyl)benzene)-iron(+)-hexafluorophosphate(−)); IRGACURE 250 (diaryliodonium salt of hexafluorophosphate dissolved in 25 percent propylene carbonate); diphenyliodonium 2-carboxylate monohydrate; CD 1010 (triaryl sulfonium hexafluoroantimonate (50 percent propylene carbonate)); CD 1011 (triaryl sulfonium hexafluorophosphate (50 percent propylene carbonate)); CD 1012 (diaryl iodonium hexafluoroantimonate; [4-(octoyloxy)phenyl]phenyliodonium hexafluoroantimonate; and UVACURE 1590 (a mixture of triarylsufonium hexafluorophosphate salts in 50 percent propylene carbonate). The products designated CD 1010, 1011 and 1012 are commercially available from the Sartomer company.

In addition to ITX compound identified above, other sensitizers may be employed, in appropriate circumstances, for rendering a UV photoinitiator responsive to radiation beyond the normal UV range. Such additional sensitizers include, for example, 2-chloro-thioxanthone, chloro-4-propoxy-thioxanthone, 2,4-diethyl-thioxanthone, and 2-ethyl-9,10-dimethoxy-anthracene.

As indicated above, the compositions of the present invention may be formulated for initiation by a chemical agent and/or by heat (e.g., by using any conventional thermal initiator, such as t-butyl perbenzoate or peroctoate) rather than, or in addition to, initiation by means of actinic radiation. Standard aminealdehyde condensation products (of the kind commercially available from the R.T. Vanderbilt company under the VANAX trade designation) will normally be employed for chemical initiation, but other classes of chemical activators, well known in the art, may of course be utilized as appropriate. It will also be appreciated that the color change referred to herein is one that occurs under the conditions of polymerization; e.g., at room temperature, in the case of photopolymerizable compositions.

Reactive acrylate monomers that are suitable for use in the instant formulations include both monofunctional and polyfunctional acrylates and methacrylates. They will generally be reaction products of acrylic acid and/or methacrylic acid with one or more mono- or poly-basic, substituted or unsubstituted, alkyl ($C_1$ to $C_{18}$), aryl or alkyl alcohols. Acrylates in which the alcohol moiety contains a polar substituent (e.g., an hydroxyl, amine, halogen, cyano, heterocyclic or cyclohexyl group) will often be preferred because crosslinking, or other intermolecular bonding, is promoted thereby. Suitable such monomers are well known in the art and are disclosed, for example, at line 53, column 6, through line 35, column 7 of Bachmann et al. U.S. Pat. No. 4,429,088, and at line 14, column 4 through line 52, column 5 of U.S. Pat. No. 4,451,523. Nevertheless, it might be noted that the following acrylates and corresponding methacrylates (the methacrylate compounds being preferred in many instances) are especially suitable for use in the present compositions, alone or in combination with one another: hydroxyethylacrylate, isobornyl acrylate, tetrahydrofurfuryl acrylate, diethyleneglycol diacrylate, 1,4-butanediol diacrylate, butylene glycol diacrylate, neopentyl glycol diacrylate, octylacrylate and decylacrylate (normally in admixture), polyethyleneglycol diacrylate, trimethylcyclohexyl acrylate, benzyl acrylate, butyleneglycol diacrylate, polybutyleneglycol diacrylate, tripropyleneglycol diacrylate, trimethylolpropane triacrylate, di-trimethylolpropane tetraacrylate, pentaerythritol tetraacrylate, and di-pentaerythritol pentaacrylate.

About 1 to 10 weight percent of acrylic acid or methacrylic acid will beneficially be employed in such an acrylate formulation, to increase adhesion. A tautomeric acid constituent may also contribute to bond strength; although maleic acid is preferred, other acids capable of cyclic tautomerism can also be used, such as malic, salicylic, itaconic.

Epoxide compositions that are suitable for use in the compositions of the invention are generally described in the paragraph beginning at line 43 in column 4 of U.S. Pat. No. 4,595,604, and in the passage beginning at line 47 of column 3 through line 65 of column 4 of U.S. Pat. No. 5,514,729; the disclosures of these patents, as well as of the Bachmann et al. patent identified above, are incorporated hereinto by reference thereto. Many other epoxide formulations are well known, and their suitability for use in the practice of the present invention will be evident to those skilled in the art from the description provided herein; they broadly include cycloaliphatic epoxies, Bisphenol A resins, Bisphenol F resins, resorcinol diglycidyl ether, epoxy phenol novolac resin, epoxy cresol novolac, glycidyl ethers, halogenated diglycidyl ethers, polyglycol diepoxides, epoxidized oils (e.g., epoxidized linseed oil, epoxidized soy bean oil, epoxidized octyl tallate, etc), epoxidized elastomers (e.g., epoxidized polybutadiene, epoxidized polyisoprene, epoxidized rubber), epoxidized siloxanes and silicones, and glycidyl isocyanurates. Exemplary epoxy compounds that may be employed include 3,4-epoxycyclohexylmethyl-3,4-epoxy-cyclohexanecarboxylate, bis-(3,4-epoxycyclohexyl)adipate, and diglycidyl ether of bisphenol A.

Among the vinyl compounds that are suitably employed as comonomers in the instant formulations are included those that conform to the structural formula:

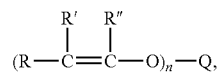

in which formula each of the substituents R, R' and R" independently represents an hydrogen atom, an aliphatic group, or an aromatic group; n is an integer, usually having a value from 1 to 6; and Q represents an aliphatic group, an aromatic group, an alkoxy group, a cycloaliphatic group, an ester group, a polyester group, an ether group, a polyether group, a carbamide group, a carbamate group, an heterocyclic group, or the like, each of such groups optionally being further substituted by an hydroxyl or a vinyl group, or both. Vinyl ether-terminated ester monomers and vinyl ether-terminated aromatic urethane oligomers may find utility herein, and it is believed that analogous compounds in which a sulfur atom replaces the oxygen of the ether group(s) may be used as well (alone or in combination) as a diluent ingredient.

Suitable specific vinyl ether compounds include the following: cyclohexyl vinyl ether; tetrahydrofurfuryl vinyl ether; 1,4-cyclohexanedimethanol divinyl ether (CHVE); triethylene glycol divinylether (3,6,9,12-tetraoxatetradeca-1,13-diene); hydroxybutyl vinyl ether; propenyl ether of propylene carbonate; n-dodecyl vinyl ether; 1,3-benzenedicarbonxylic acid, bis [4-(ethenyloxy) butyl]ester; hexanedioic acid, bis [4-(ethenyloxy butyl]ester or bis [4-(vinyloxy)butyl]adipate; polyester divinyl ether; urethane divinyl ether; aliphatic urethane divinyl ether; aromatic urethane divinyl ether, with 12% CHVE; pentaneodioic acid, bis[[-4[(etheneyloxy) methyl]cyclohexyl]methyl]ester; butanedioic acid, bis [4(ethenyloxy butyl]ester or bis [4-(vinyloxy)butyl]succinate; and polyester polyfunctional divinyl ethers.

Allylic compounds corresponding to the foregoing vinyl compounds may also be employed advantageously in the practice of the invention, and are regarded to fall within the broad characterization "vinyl" compounds. Nevertheless, particular allyl compounds that are suitable for use herein include aliphatic allyl urethane and aliphatic tetraallyl urethane, available from Sartomer company under the respective designations CN 9101 and PRO6322, allylglycidyl ether alcohol resin available from Solutia company as XI-100, di(ethylene glycol) bis(allyl carbonate), triallyl trimellitate, allyl propoxylate available from Arco Chemical company as ARCAL AP 1375, allyl methacrylate available from Degussa-Huls Rohm America Inc. as MHOROMER MFM-401, di(ethylene glycol) bis(allyl carbonate) available from PPG company as CR-39, a mixture of methyl methacrylate/allyl methacrylate copolymer (25%) and CR-39 (75%), available from Hampford Research, Inc. as BX-946, and an allyl ether of substituted urea, available from Rhodia company as SIPOMER WAM.

Any comonomer (or mixture of comonomers) employed will typically comprise 5 to 40 weight percent of a composition embodying the invention. The amount used will of course depended upon many factors, including the particular ingredients of a formulation, the application for which it is intended, etc., as will be evident to those skilled in the art. It will also be appreciated that the comonomer may comprise other well known reactive diluents, such as oxetane, furan, a suitable alcohol, etc.

A free-radical reactive oligomer and/or a cation-reactive oligomer will normally be included in the composition, but it should be appreciated that, depending upon the properties the cured formulation is to have, such an ingredient may or may not be necessary. Oligomers suitable for use are well known in the art, and comprise vinyl polymers, acrylic polymers, polyester elastomers, glycol polymers, acrylated epoxies, natural and synthetic rubbers, polyester acrylates, epoxy acrylates, polyether acrylates, alkyd acrylates, polyol acrylates, and the like. The use of the urethane polymers and prepolymers will often be found most beneficial, with the latter being especially desirable due to the potential that they afford for further reaction of their pendant isocyanate groups with a reactive functionality (e.g., an hydroxyl group) provided by a suitable acrylate monomer. Diisocyanate-capped polyethers and polyesters, acrylated by reaction with hydroxyethyl acrylate or hydroxyethyl methacrylate and having a molecular weight of about 400 to 6,000 g/mol, are particularly preferred.

It will be appreciated that the foregoing organic reactants may serve both for the production of the cured polymers and also for the generation of the active alkylating species employed for effective decoupling of the dye molecule chromophore. Needless to say, a monomer that is found to be particularly effective as an alkylating species may be added to a formulation for the specific purpose of taking advantage of that property.

Although described primarily for bonding of surfaces to one another, it will be appreciated that compositions embodying the present invention may be employed for many other purposes, such as for potting, gap-filling, coating, etc., as will be evident to those skilled in the art. The particular properties that the instant compositions exhibit however render them especially valuable for use as conformal coatings and in the manufacture of various medical devices, such as face masks, syringes (needle bonding), catheters, tubing assemblies, reservoirs, etc. In those instances in which the formulation is to be used as a potting compound, it will usually be desirable to incorporate a chain transfer agent of the kind that is typically employed in compositions cured by electron beam initiation; e.g., halogen compounds, sulfur compounds, and secondary and tertiary aromatic hydrocarbons such as cumene, carbon tetrachloride, 1,4-diisopropyl benzene, tert-butyl benzene, bisphenol A and glycidyl ether derivatives thereof, etc. The use of chain transfer agents may serve to increase the durometer hardness of the resultant polymer, the degree of which will depend to an extent upon the concentration of the agent in the formulation, which typically will be 0.5 to 5.0, and usually 0.1 to 1.0, weight percent.

Other materials may be incorporated into the instant compositions in addition to the components hereinabove described. For example, "inert" fillers such as wood flour, cornstarch, glass fibers, cotton linters, mica, alumina, silica, and the like, may be used to modify viscosity, improve impact resistance, and for other purposes, and it is conventional to include small percentages of silane coupling agents to increase moisture resistance as well as to enhance bond strength to glass and similar surfaces. Substances such as fluorescing agents, flame retarders, stabilizers (e.g., the quinones and hydroquinones), viscosity modifiers (thixotropes, thickeners, viscosity reducers), plasticizers, antioxidants, and the like, may be incorporated as well.

The compositions of the invention may be provided as two or more components which produce, in combination, the desired final properties of the cured deposit; such a formulation may afford improved shelf-life and pot-life of the individual and mixed components, rheological and flow characteristics, and other necessary or desirable properties. Although the preferred compositions of the invention will usually be free from non-reactive solvents, it will be appreciated that small amounts of water and/or other solvents may necessarily be present as a practical matter, such as to facilitate the introduction of an ingredient.

Thus, it can be seen that the present invention provides a novel polymerizable composition in which curing is reliably and unequivocally indicated, and it provides a novel polymerization method in which inherent confirmation of curing of the composition is afforded. More specifically, the invention provides such a composition and method wherein and whereby curing is indicated by a permanent color change. The composition will usually be solvent-free and comprised of (meth)acrylate monomer or an epoxy monomer, optionally including a vinyl ether or an allyl monomer copolymerized therewith, and curing may be initiated by a free radical or cationic mechanism, respectively. The dye molecule may desirably be reacted with an ingredient of the composition to integrate it into the polymer chain of the cured product.

Having thus described the invention, what is claimed is:

1. A composition that cures by polymerization and that exhibits a substantially permanent color change during curing, comprised of: at least one polymerizable compound, the reaction of which is initiated by an active species selected from a first group, consisting of free radicals and ions; at least one initiator ingredient that generates said active initiating species when activated, said at least one initiator ingredient being present in an amount sufficient to effect substantially complete curing of said composition; and a non-photobleaching dye, present in said composition in an amount sufficient to impart perceptible color to said composition in the uncured state, the molecule of said dye comprising at least one conjugated system containing a chromophore that is subject to effective permanent decoupling, by reaction at at least one site, so as to cause substantially complete and substantially irreversible loss of said color, said composition containing at least one ingredient that produces a reactive alkylating species, that is effective for decoupling of said chromophore, in the presence of said active initiating species and under the conditions of polymerization of said composition.

2. The composition of claim 1 wherein said molecule of said dye comprises a plurality of conjugated systems interconnected by a linking region, said linking region providing said at least one reaction site.

3. The composition of claim 1 wherein said at least one polymerizable compound is a monofunctional unsaturated (meth)acrylate monomer, and said active initiating species constitutes free radicals.

4. The composition of claim 1 wherein said at least one polymerizable compound is an epoxy monomer, and wherein said active initiating species constitutes a cation.

5. The composition of claim 1 wherein said dye is a cationic triphenyl methane compound.

6. The composition of claim 5 wherein said dye is selected from the group consisting of Crystal Violet, Victoria Blue, Malachite Green and New Fuchsin.

7. The composition of claim 1 wherein said at least one initiator ingredient is a photoinitiator.

8. The composition of claim 7 wherein said at least one photoinitiator ingredient is responsive to actinic radiation in the UV range of wavelengths for generating said active initiating species.

9. The composition of claim 8 wherein said composition additionally includes a coagent that sensitizes said UV-responsive photoinitiator ingredient to respond to wavelengths in the visible range.

10. The composition of claim 3 wherein said composition additionally includes a vinyl compound copolymerizable with said (meth)acrylate monomer.

11. The composition of claim 4 wherein said composition additionally includes a vinyl compound copolymerizable with said epoxy monomer.

12. The composition of claim 1 wherein said dye is reacted with a polymerizable compound in said composition so as to become part of a growing polymer chain produced during curing of said composition.

13. A method for determining substantially complete cure of a polymerizable composition, including the steps:

providing a polymerizable composition comprising at least one polymerizable compound that is initiated by an active species selected from a first group, consisting of free radicals and ions; at least one initiator ingredient that generates said active initiating species when activated, said at least one initiator ingredient being present in an amount sufficient to effect substantially complete curing of said composition; and a non-photobleaching dye, present in said composition in an amount sufficient to impart perceptible color to said composition in the uncured state, the molecule of said dye comprising at least one conjugated system containing a chromophore that is subject to effective permanent decoupling, by reaction at at least one site, so as to cause substantially complete and substantially irreversible loss of said color, said composition containing at least one ingredient that produces a reactive alkylating species, that is effective for decoupling of said chromophore, in the presence of said active initiating species and under the conditions of polymerization of said composition;

subjecting said composition to conditions for effecting activation of said initiator ingredient to generate said active initiating species; and monitoring said composition to detect the loss of said perceptible color imparted thereto by said non-photobleaching dye.

14. The method of claim 13 wherein said molecule of said dye comprises a plurality of conjugated systems interconnected by a linking region, said linking region providing said at least one reaction site.

15. The method of claim 13 wherein said at least one polymerizable compound is a monofunctional unsaturated (meth)acrylate monomer, and said active initiating constitutes free radicals.

16. The method of claim 13 wherein said at least one polymerizable compound is an epoxy monomer, and wherein said active initiating species constitutes a cation.

17. The method of claim 13 wherein said dye is a cationic triphenyl methane compound.

18. The method of claim 13 wherein said at least one initiator ingredient is a photoinitiator, and wherein said conditions for effecting activation comprise exposing said composition to actinic radiation.

19. The method of claim 18 wherein said at least one photoinitiator ingredient is responsive to actinic radiation in the UV range of wavelengths for generating said active initiating species, and wherein said conditions for effecting activation comprise exposing said composition to UV radiation.

20. The method of claim 18 wherein said at least one photoinitiator ingredient is responsive to actinic radiation in the UV range of wavelengths for generating said active initiating species, wherein said polymerizable composition additionally includes a coagent that sensitizes said UV-responsive photoinitiator ingredient to respond to wavelengths in the visible range, and wherein said conditions for effecting activation comprise exposing said composition to visible wavelengths of radiation.

21. The method of claim 15 wherein said composition additionally includes a vinyl compound copolymerizable with said (meth)acrylate monomer.

22. The method of claim 16 wherein said composition additionally includes a vinyl compound copolymerizable with said epoxy monomer.

23. A composition that cures by polymerization and that exhibits a permanent loss of color during curing, comprised of: at least one polymerizable monofunctional unsaturated (meth)acrylate monomer, the reaction of which is initiated by an active species consisting of free radicals; at least one initiator ingredient that generates said active initiating species when activated, said at least one initiator ingredient being present in an amount of about 1 to 8 weight percent, and sufficient to effect substantially complete curing of said composition; and a non-photobleaching dye, present in said composition in an amount sufficient to impart perceptible color to said composition in the uncured state, the molecule of said dye comprising at least one conjugated system containing a chromophore that is subject to effective permanent decoupling, by reaction at at least one site, so as to cause substantially complete and substantially irreversible loss of said color, said composition containing at least one ingredient that produces a reactive alkylating species, that is effective for decoupling of said chromophore, in the presence of said active initiating species and under the conditions of polymerization of said composition.

* * * * *